Sept. 20, 1966  W. P. SIEGMUND  3,273,445
FIBER OPTICAL FACE PLATES HAVING DIFFERENT NUMERICAL
APERTURE VALUES IN TWO DIFFERENT DIRECTIONS
Filed Oct. 22, 1962
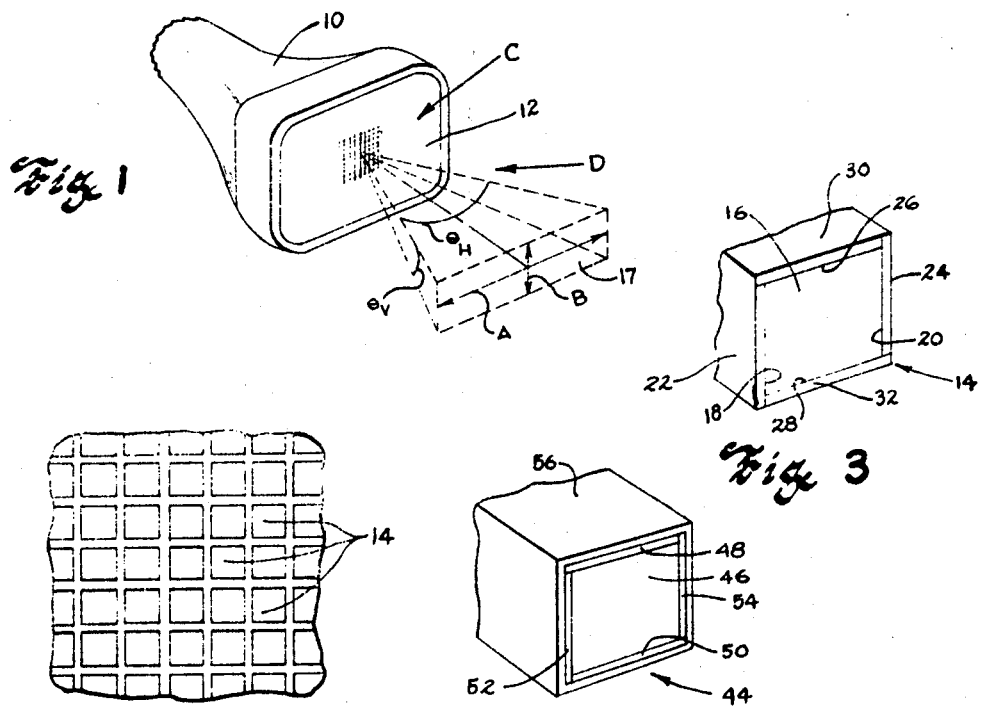
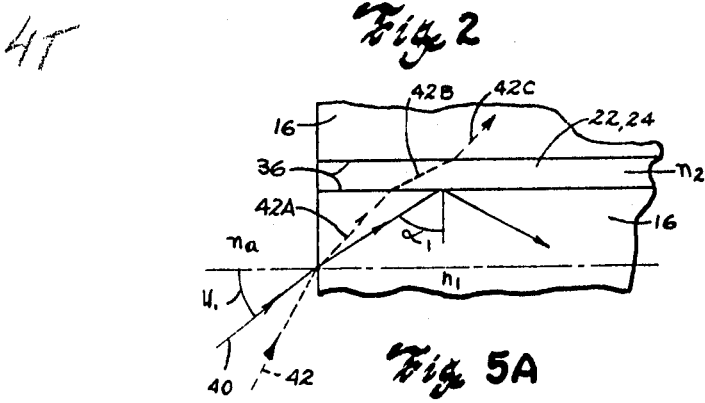
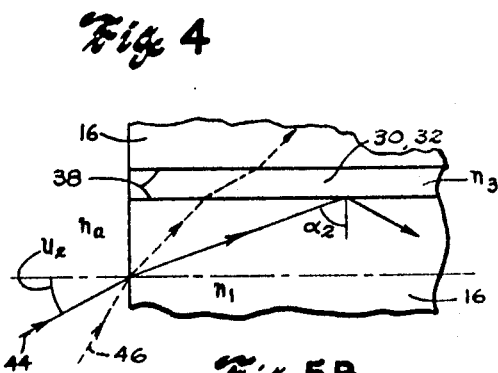
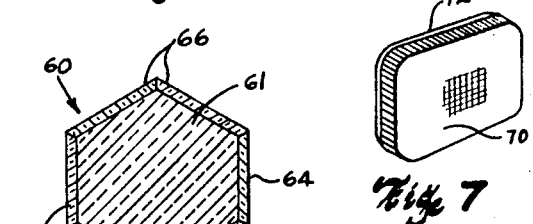
INVENTOR
WALTER P. SIEGMUND
By 
ATTORNEYS

United States Patent Office 3,273,445
Patented Sept. 20, 1966

3,273,445
FIBER OPTICAL FACE PLATES HAVING DIFFERENT NUMERICAL APERTURE VALUES IN TWO DIFFERENT DIRECTIONS
Walter P. Siegmund, Woodstock, Conn., assignor to American Optical Company, Southbridge, Mass., a voluntary association of Massachusetts
Filed Oct. 22, 1962, Ser. No. 232,192
17 Claims. (Cl. 88—1)

This invention relates to improvements in light-conducting fibers and to fiber optical image-transmitting or image transfer face plates, cover plates and the like formed therefrom, and which plates or the like are intended for use in or in conjunction with cathode ray tubes and the like.

More particularly the invention relates to improvements in light-conducting fibers which are of such construction, arrangement and characteristics as to provide different numerical aperture values for the light rays being transmitted therethrough, when considered in at least two different predetermined transverse directions relative thereto, as well as to improvements in fiber optical image-transmitting or image transfer plates constructed therefrom and which plates have the light-conducting fibers thereof so arranged and disposed as to provide restricted viewing angles of different values when considered in at least two different transverse directions relative to said plates and with the image being formed thereon being substantially free from any ill effects due to external lighting conditions or the like.

The improved light-conducting fibers and the improved image transfer plates constructed therefrom are, in fact, of such characteristics, on the one hand that, during use thereof, at least two different predetermined restricted angular values for the optimum image-viewing area in front of the plate will be provided thereby when considered in different predetermined directions across the face of the plate, while, nevertheless, simultaneously giving good light intensity at all points within the image field being viewed and for all different viewing positions within said predetermined image-viewing area and being, on the other hand, of such construction and arrangement as to provide nearly complete elimination of detrimental effects in image contrast due to both "stray" light from within the tube and ambient light from points outside the tube and laterally spaced from said predetermined optimum viewing area.

It is already known that a fiber optical face plate, for a cathode ray tube or the like, formed of a very large number of thin, elongated high refractive index glass fibers coated with glass of a lower refractive index and fused together in side-by-side generally parallel relation to each other can be employed for transmitting an optical image from the phosphor layer upon the interior surface of the face plate of the tube to the exterior surface thereof. Furthermore, in co-pending application Serial No. 757,850, filed August 28, 1958 (and which issued October 30, 1962, as U.S. Patent No. 3,060,789), there is disclosed an improved construction and arrangement wherein the light-conducting fibers of such a fiber optical face plate have the cores and claddings or coatings thereof formed of glasses which are not only preselected so as to provide a higher refractive index for the cores than the claddings for keeping the light being transmitted within the cores but wherein the cladding glass thereof is also so preselected as to additionally have a predetermined light-absorption characteristic as well.

In said application, it is pointed out that the absorption characteristics of the cladding material are so chosen that, when same are considered together with other related factors of the individual light-conducting fibers, such as the cross-sectional dimensions of the core and cladding, the length of the fiber and the refractive indices of the core and cladding thereof, the cladding can be made to give an adequate amount of absorption so that attenuation of most of the "stray" light rays from the phosphor layer within the tube which enter the fiber cores at the inner ends thereof and at angles greater than the maximum aperture angle provided by the refractive index difference between core and cladding will not materially affect the image contrast being provided by the face plate.

It has now been found that improved light-conducting fibers and improved fiber optical image-conducting or image transfer face plates, cover plates and the like can be made therefrom in such a manner that such a plate, whether same is used as an integral part of a cathode ray tube or the like, or employed immediately in front of a fiber optical face plate of a cathode ray tube will be provided, when considered in at least two different transverse directions thereof, at least two different predetermined restricted angular values for the optimum image-viewing area of the plate and which area is, nevertheless, substantially free from image deterioration due to ambient lighting conditions or the like and which gives, at the same time, good image light intensity at all points of the image field being viewed and from all different positions of viewing within said optimum viewing area.

A fiber optics face plate of such improved construction may be highly desirable in certain conditions of use particularly when a restricted viewing area is quite sufficient and when ambient light particularly of strong intensity might be a disturbing or even a defeating factor if a conventional type face plate were being used. An example of such would be from a position in the cockpit of a fighter-type aircraft or in the control tower of an air field and wherein light from a side or overhead might tend to "wash out" the picture image contrast if a conventional type cathode ray tube screen were being used.

It is, accordingly, an object of the present invention to provide an improved light-conducting fiber formed by a thin, elongated core of transparent material of square, rectangular or other controlled geometric cross-sectional shape and a thin cladding surrounding said core and in fused, bonded or cemented relation thereto and with all parts of said cladding being formed of materials of preselected lower refractive indices than that of said core but with certain selected parts of said cladding, such as those parts forming the top and bottom surfaces of the fiber, being of predetermined greater refractive index than the index of other parts of the cladding, so that an image-viewing area of at least two different dimensions in transverse different directions thereof will be provided by said fiber.

It is also an object of the invention to provide such an improved light-conducting fiber which additionally has a predetermined amount of light absorption per unit length of fiber and with said absorption being obtained by means of light-absorbing ingredients embodied within the cladding material itself, or alternatively by means of an over-cladding completely surrounding said fiber core and said low index cladding and with said over-cladding having said predetermined amount of light absorption per unit length of fiber and wherein said unit length of fiber is equal to the thickness of the face plate, or the like, in which a plurality of such fibers are to be used in side-by-side bunched relation so that most of the ambient light which enters the face plate from points outside the viewing area thereof and "stray" light at angles above the maximum aperture angle from inside the tube will be attenuated and image contrast deterioration will be avoided.

It is also an object to make such improved fibers entirely of plastics of different kinds, or of both glass and plastics, or entirely from glasses of different kinds in accordance with the specific requirements of the face plate, or the like, to be formed therefrom.

It is also an object to provide fiber optics face plates, cover plates, rear projection viewing screens and the like formed of many such improved optical fibers in side-by-side bunched and similarly oriented arrangement.

Other objects and advantages of the invention will become apparent from the detailed description which follows when taken in connection with the accompanying drawings in which:

FIG. 1 is a perspective view of a cathode ray tube or the like having an integral fiber optical face plate embodying the present invention;

FIG. 2 is an enlarged fragmentary front view of a part of face plate of FIG. 1;

FIG. 3 is a perspective view showing an end portion of a light-conducting fiber embodying the present invention;

FIG. 4 is a perspective view showing an end portion of a modified form of light-conducting fiber embodying the present invention;

FIGS. 5A and 5B are diagrammatic illustrations of certain light-conducting characteristics of a fiber embodying the present invention and considered along longitudinal horizontal and longitudinal vertical sections thereof, respectively, for the purpose of obtaining a better understanding of the invention;

FIG. 6 is a cross-sectional view of a modified form of optical fiber embodying the present invention; and FIG. 7 is a perspective view of a fiber optical cover plate embodying the invention, and which may have added thereto a light-diffusing layer, or equivalent light-diffusing means on the rear face thereof.

Referring to the drawings in detail, it will be seen that in FIG. 1 there is shown a cathode ray tube 10 having a face plate 12 made in accordance with the present invention. A greatly enlarged fragmentary front view of a part of this face plate is shown in FIG. 2, and comprises a very large number of similarly shaped fiber optical elements or components 14 which are fixedly secured or fused together in side-by-side generally parallel bunched relation so as to form an integral gas-tight face plate of desired size and shape. Of course, it will be readily appreciated that the size of the individual fiber optical elements or components of a completed face plate will be such as to provide good image resolution in accordance with the size of the face plate and intended use to be made thereof.

In certain uses of a cathode ray tube, such as in a radar scope, or the like, it may be desirable to have not only the best possible screen image viewing conditions within a predetermined limited image-viewing area in front of the tube and to also have the extent of this viewing area in one transverse direction thereof of a different angular value than that in a second transverse direction thereof, but also to be able to definitely restrict the lateral extents of this viewing area in such a manner that the ill effects of ambient lighting conditions, for example, near either side of this area or from overhead, which might otherwise cause deterioration in image contrast, may be substantially eliminated.

To accomplish such an improved fiber optical element or component and improved fiber optical face plates or the like with different preselective ranges for the optimum image-viewing area thereof in at least two different directions, each component 14 of said face plate, may comprise, as shown in FIG. 3, a fiber core 16 of transparent material of a predetermined refractive index and of a predetermined geometrical cross-sectional shape, and each is encased in a cladding formed of materials of lower refractive indices in a controlled manner as will be presently described.

While a core of material of square cross-sectional shape is shown in FIGS. 2 and 3, and is preferred, it will be evident from the description which follows that other known cross-sectional shapes may be used, and, of course, the particular shape actually desired and used in a face plate might very well depend upon other factors such as the particular type of external lighting to be encountered or the ease of fabrication of the fiber or face plate.

The invention is such that, as indicated in FIG. 1, for example, a restricted image-viewing area 17 of different selected width and height within which good image-viewing will be obtained and outside of which substantially no image will be visible. The relatively long double-headed horizontally disposed arrow A and a relatively shorter double-headed vertically disposed arrow B, indicate the extent of the rectangularly-shaped configuration of one possible image-viewing area 17 which might be desirable in front of the face plate 12. In fact, this might be the shape and size desired in front of the pilot of a single-seater fighter plane or the like. Within this rectangular area, an optimum viewing of the screen image will be obtained but outwardly of this area, no screen image of any consequence will be visible. On the other hand, arrows C and D may represent by way of explanation two different directions from which normally objectionable ambient light rays outside the image area may approach the face plate; the light ray C coming from overhead and the light ray D approaching from the side. Since both of these rays at the face plate will have angles of incidence greater than the angular values of image-forming light rays emerging from the face plate which reach area 17, they will not be allowed to pass through the face plate and materially affect image contrast at the phosphor layer within the tube.

While in a conventional cathode ray tube face plate, or even in a less conventional fiber optical face plate therefor, the light rays represented by arrows C and D might the face plate and affect the phosphor layer within and thereby lessen image contrast, in the improved face plate of the present invention this will not occur. Instead, the invention accomplishes an optimum condition of image-viewing within the restricted image-viewing area 17 while, in effect, excluding said outside ambient light therefrom even though said image area is of different transverse and vertical dimensions.

As already stated, the fiber 14, as shown in FIGS. 2 and 3, is of square cross-sectional shape as is also its core 16 which is formed of a clear glass of a predetermined refractive index. When this shape is used, it will be provided with flat opposed sides 18 and 20 to which layers of cladding glass 22 and 24 of a lower preselected refractive index value than that of the core may be secured. Also, the square core 16 provides flat surfaces 26 and 28 at the top and bottom thereof to which layers 30 and 32 of cladding glass of a different preselected refractive index lower than the core are likewise secured. While layers 22 and 24 and layers 30 and 32 are both of lower refractive indices than that of the core material, the glass forming layers 30, 32 is, nevertheless, purposely preselected so that a lesser predetermined refractive index difference between core and cladding will be provided each fiber in the vertical direction thereof than will be provided between core and cladding in the horizontal direction thereof. In this way, a more restricted viewing angle will be provided for the viewing area in the vertical direction thereof than in the horizontal direction thereof; and, of course, it follows that the face plate will thus be, in effect, more nearly completely shrouded to ambient light in the vertical direction thereof than in the horizontal.

Additionally, the glasses forming the layers 22, 24, 30 and 32 of cladding material are chosen with particular reference to the coefficients of light absorption thereof, as will be more fully explained hereinafter, so that these layers will attenuate most of the light rays which enter the claddings adjacent either ends thereof.

In order that a better understanding may be had as to the manner in which the proper materials for forming the improved face plates may be preselected to give optimum image-viewing qualities with a controlled value as to image-viewing angle in the horizontal direction and as to a different controlled image-viewing angle in the vertical direction thereof, as well as proper light absorption characteristics therefor, reference is made to FIGS. 5A and 5B wherein in FIG. 5A end portions of two adjacent fibers are diagrammatically shown in longitudinal horizontal section and wherein FIG. 5B end portions of two adjacent fibers are shown in a longitudinal section at right angles thereto.

Thus, in FIG. 5A, two high index glass cores 16 are shown with the cladding glass 22, 24, of lower refractive index in fused, bonded or cemented relation thereto so as to form optical interfaces 36 between cores and claddings and in FIG. 5B, the cores 16 are shown with the cladding glass 30, 32, of lower refractive index than the core glass (but of a higher index than cladding glass 22, 24), in fused, bonded or cemented relation thereto so as to form optical interfaces 38. From the figures, it will be appreciated that if a light ray entering the outer end of a core, such as light ray 40 in the plane of the paper in FIG. 5A is, in fact, the light ray of maximum horizontal angular aperture value $U_1$ which, after entering the glass core 16 of refractive index value $n_1$, will be totally internally reflected at the first interface 36, then angle $\alpha_1$ can be considered as the angle of smallest value for light rays which after entering the core will be totally internally reflected. Thus, this internal angle may also be considered substantially equal to the critical angle of total internal reflection for the combination of the materials being used and wherein the index of the core material is $n_1$ and of the index of the cladding material is $n_2$.

Accordingly, a light ray, such as dotted light ray 42 of ambient light in FIG. 5A which enters the outer end of one core 16 at a greater angle than $U_1$ will have within the core as indicated by part 42A an angle of incidence at the first interface 36 which is smaller than critical angle $\alpha_1$, and this ray with some refraction will pass, as indicated by part 42B, through the cladding with some absorption before reaching the second interface 36. Then it will be refracted again as it passes through the second interface 36, and enters the second core 16 as indicated by part 42C. Thus, this ambient light will pass successively through many absorbing layers before reaching the opposite face of the face plate.

It follows that if such light is allowed to reach the phosphor at the inner end of the fiber, it will tend to activate the phosphor and thus reduce contrast in the image being formed thereby.

As is well known in fiber optics, the maximum angular aperture value for the horizontal angle $U_1$ for the clad fiber 14 may be determined by the formula:

$$\sin U_1 = \sqrt{n_1^2 - n_2^2} \quad (1)$$

Note that this maximum horizontal aperture angle $U_1$ is equal to one half of the angle of horizontal spread $\theta_H$ as shown in FIG. 1 which, of course, is equal to the horizontal dimension A of the image-viewing area 17.

In a somewhat similar manner, it can be shown that if light ray 44 in the plane of the paper is taken to indicate the light ray of maximum vertical angular aperture value $U_2$ which, after entering the outer end of the core 16, will be totally internally reflected at the optical interface 38 and if the refractive index $n_3$ of the cladding 30, 32 is of a predetermined value between the low index value $n_2$ of the ladding material 22, 24 and the higher refractive index value $n_1$ of the core, it can be determined from the formula $$\sin U_2 = \sqrt{n_1^2 - n_3^2} \quad (2)$$

that the angular value of $U_2$ will be less than the angular value of $U_1$. Of course, dotted ray 46 of greater angular value than $U_2$, after entering the core 16, will not be internally reflected at the interface 38. Thus, $\alpha_2$ may be considered substantially equal to the critical angle of total internal reflection in the vertical direction. Also note that $U_2$ is equal to one-half of the angle of vertical spread $\theta_V$ shown in FIG. 1 which, of course, is equal to the lesser vertical diamension B of the viewing area 17.

Accordingly, the cladding 22, 24 and the cladding 30, 32 will be formed of different glasses both of which have been carefully selected for proper refractive index values and also for proper coefficient of absorption; and with the latter being such that substantially all of the light rays which enter the fiber core 16 at angular values greater than maximum aperture angles thereof and which, accordingly, will thereafter enter the cladding material will be nearly completely absorbed by the cladding material before reaching the opposite face of the face plate.

Selection of the core glass and each different cladding glass should also be made in accordance with the geometric shape and cross-sectional dimensions of the core and claddings as well as the length desired in the fibers of the finished face plate; having in mind that the cladding materials, for best results, should be such as to absorb approximately 90 percent, for example, of the ambient light from outside the viewing area as it travels diagonally and passes successively through many different cladding layers before reaching the opposite face of the face plate. When such absorption is provided not only will unwanted ambient light be sufficiently absorbed but also absorption of most of the "stray" fluorescent light from the phosphor layer adjacent the inner ends of the fibers 14 will likewise be accomplished.

A cathode ray tube face plate which, for example, is of such a construction as to have approximately a 25 degree angle of vertical spread $\theta_V$ for the optimum image-viewing area and a 90 degree angle of spread in the horizontal direction thereof, can be achieved, for instance, by combining a square core of clear glass of a refractive index of approximately 1.685 with cladding layers on its top and bottom of glass of approximately 1.670 index and with cladding layers on its sides of approximately 1.520 glass and to all four of which layers of cladding glass small but equal amounts of chromic oxide and gold chloride have been added for absorption purposes during the making of the glass.

Or, it might be more satisfactory to fabricate an overclad square fiber like that indicated in FIG. 4 for forming the face plate having the same size and shape of viewing area and glasses to be used therefor could be determined as follows: The numerical aperture in the horizontal direction, $NA_H$, is equal to $\sin \theta_H/2$ which is equal to $\sqrt{n_1^2 - n_2}$. The numerical aperture in the vertical direction, $NA_V$, is equal to $\sin \theta_V/2$ which is equal to $n_1^2 - n_3^2$. Also note that $$(NA_H)^2 - (NA_V)^2 = n_3^2 - n_2^2$$

Since $\theta_H$ is equal to 90° and $\theta_V$ is equal to 25°, $$NA_H = \sin \theta_H/2 = .707$$

and $NA_V = \sin \theta_V/2 = .216$.

Thus, to get an approximate idea of the types of glass which might be used, we take $$(NA_H)^2 - (NA_V)^2 = (.707)^2 - (216)^2 = .453.$$

Then $$n_2^2 - n_3^2 = (n_2 + n_3) \cdot (n_2 - n_3)$$

and since $n_2$ and $n_3$ will generally average about 1.55, $$(n_3 + n_2) = 3.1$$

Thus $$3.1(n_3 - n_2) = 0.451 \text{ or } n_3 - n_2 = 0.15$$

Since the lowest index for a cladding glass which is likely to be compatible with a high index flint core glass is about 1.52 (for the side claddings, $n_2$) then $n_3$ would be about $1.52 + 0.15 = 1.67$. From the formula $$n_1 = \sqrt{(NA_V)^2 + (n_3)^2}$$

we have $$n_1 = \sqrt{(.216)^2 + (1.67)^2}$$

or $n_1 = 1.685$.

The refractive index of the light-absorbing over-cladding glass is not too important and probably would be a soda-lime glass of about 1.52.

In order for an assembly like that in FIG. 4 to draw down properly and maintain geometric symmetry, it is desirable for all of the glasses to be reasonably matched as to viscosities at the drawing temperature. Glasses which would qualify and which are commercially available are:

| Type | $N_D$ | Expansion Coefficient | Transformation Temperature, °C. |
|---|---|---|---|
| SF-8 | 1.689 | 81 | 433 |
| SF-5 | 1.673 | 83 | 445 |
| KF-7 | 1.523 | 85 | 450 |

Recomputing the beam spread using these values, we have $$NA_H = \sqrt{(1.689)^2 - (1.523)^2} = .73$$

and $$NA_V = \sqrt{(1.689)^2 - (1.673)^2} = .224$$

or $\theta_H = 94°$ and $\theta_V = 26°$.

And a suitable absorbing glass over-cladding may be made by adding colorants such as manganese and nickel to the soda-lime glass base. For example, 20% $M_n$ added to the soda-lime glass base will give a glass with about 1% transmission through a thickness of glass of 0.5 mm. Also 12% $M_n$ and 8% Ni added will give a slightly less amount of absorption but will be a little more neutral in color.

The thickness of a fiber optics cathode ray tube face plate may range between ¼ and ½ inch, or a little more, and the volume percentage of the absorption glass claddings to be used to determine the degree of attenuation desired for the ambient light incident upon the face plate outside the maximum aperture angles $U_1$ and $U_2$, for example, can be figured therefrom in the manner suggested in said application No. 757,850. Also, the fiber sizes would ordinarily range from approximately 0.002″ to 0.010″.

In FIG. 4, the modified form of over-clad absorbing fiber 44 already referred to comprises a core 46 of high predetermined refractive index, top and bottom cladding layers 48 and 50 of substantially non-absorbing glass of slightly lower refractive index and side wall cladding layers 52 and 54 of substantially non-absorbing glass but of appreciably lower refractive index. About the outside of all of these cladding layers is shown the absorbing layer 56 of glass of suitable thickness and of such light absorption as to attenuate approximately 85 to 95% of the light which tends to pass diagonally and successively through the cores and cladding layers, both ambient light from outside points and fluorescent light from the inside, to the opposite face of the face plate when in use.

Another suitable glass for forming the very thin outer layer 56 would be the highly absorbing glass made by Pittsburgh Plate Glass Company under the trade name Black Carrara, and which glass has approximately 50% absorption in 0.2 mm. of thickness. Other known black glasses of different absorptions, of course, might also be used.

In FIG. 6 is shown a clad fiber 60 of modified shape which might likewise be used in large numbers in making face plates in accordance with the present invention; said fiber being formed by a hexagonally-shaped fibre core 61 to which, for example, opposed side wall layers 62 and 64 of glass of an appreciably less pre-selected refractive index than that of the core are secured and to the upper and lower sloping wall surfaces of which are secured cladding layers 66 and 68 of glass of an intermediate pre-selected index closely approaching that of the core index so as to provide a very restricted maximum aperture angle. The necessary absorption could, as before, be incorporated into the glass forming these layers if desired, or, in keeping with the disclosure related to FIG. 4, it could be cared for by an outer encircling layer (not shown) much like that used at 56. In either event, a face plate formed by many similarly arranged fibers of this shape could be arranged so as to provide a fairly wide horizontal image-viewing angle but which would have limited image-viewing angles in other transverse directions thereof.

Each of the clad fiber shapes and structural arrangements suggested above and by FIGS. 3, 4 and 6 can be initially formed of glass rods or strips of relatively large cross-sectional sizes suitably bunched together and could have these parts or elements fused together before some are drawn down to fiber size, as is already known in the prior art; after which a large number thereof would be assembled in like side-by-side manner and fused to form the face plate. Or, a plurality of such large component parts could be assembled together and then drawn down and fused together simultaneously to form a multiple core fiber, also in known manner, after which many would be assembled in side-by-side relation and fused to form the face plate. In either case, a large number of unit lengths would be needed for forming a single integral fiber optic face plate.

In the preceding description, glass clad glass core fibers in fused-together relation to each other have been primarily discussed since glass is the material which would be ordinarily used for forming a vacuum-tight cathode ray tube face plate. However, when the improved fiber optic plate of the present invention is intended for use as a cover plate to be used against the front face of a conventional fiber optical face plate of a cathode ray tube or the like, it could have its component parts, such as cores, or cladding layers or both formed entirely of plastic materials of suitable refractive indices and suitable absorptive coefficients, or of glass and plastic materials, and could be bonded or cemented together by a plastic, lacquer, cement or the equivalent since in such uses wherein outgassing and such are not involved, a structure formed only of glass would not be required. In FIG. 7 is shown a fiber optic plate 70 embodying the invention and to the back face of which has been added a light-diffusing layer 72 so that the assembly can be used as a rear projection viewing screen. However, if this diffusing layer is not present, the plate 70 could be used as a cover plate in front of a conventional fiber optics face plate but, of course, should be in direct contact therewith in order not to lose image resolution.

Having described my invention, I claim:

1. An elongated light-transmitting optical fiber comprising a core formed of a transparent material of a predetermined refractive index and of predetermined geometric cross-sectional shape having a plurality of pairs of elongated side wall surface portions formed thereon, and with the surface portions of each pair being disposed in opposed facing relation to each other, a thin elongated layer of cladding material formed upon each surface portion, and all of said elongated layers being arranged to surround and enclose said core, the layers of cladding material upon each pair of opposed surface portions having a lower refractive index than that of said core, and the opposed layers on one of said pairs of surface portions being of a lower refractive index than the refractive index of the opposed layers on another of said pairs.

2. An elongated light-transmitting optical fiber comprising a core formed of a transparent material of a predetermined refractive index and of predetermined geometric cross-sectional shape having a plurality of pairs of elongated side wall surface portions formed thereon, and with the surface portions of each pair being disposed in opposed facing relation to each other, a thin elongated layer of cladding material formed upon each surface portion, and all of said elongated layers being arranged to surround and enclose said core, the layers of cladding material upon each pair of opposed surface portions having a lower refractive index than that of said core, the opposed layers on one of said pairs of opposed surface portions being of a lower refractive index than the refractive index of the opposed layers on another of said pairs, and each layer of cladding material having a predetermined absorbing characteristic.

3. An elongated light-transmitting optical fiber comprising a core formed of a transparent material of a predetermined refractive index and having a substantially square cross-sectional shape so as to provide a plurality of pairs of elongated side wall surface portions formed thereon, and with the surface portions of each pair being disposed in opposed facing relation to each other, a thin elongated layer of cladding material formed upon each surface portion, and all of said elongated layers being arranged to surround and enclose said core, the layers of cladding material upon each pair of opposed surface portions having a lower refractive index than that of said core, and the opposed layers on one of said pairs of surface portions being of a lower refractive index than the refractive index of the opposed layers on another of said pairs.

4. An elongated light-transmitting fiber comprising a core formed of a transparent glass of a predetermined refractive index and of predetermined geometric cross-sectional shape having a plurality of pairs of elongated side wall surface portions formed thereon, and with the surface portions of each pair being disposed in opposed facing relation to each other, a thin layer of cladding glass formed upon each surface portion, and all of said elongated layers being arranged to surround and enclose said core, the layers of cladding glass upon each pair of opposed surface portions having a lower refractive index than that of said core, and the opposed layers on one of said pairs of surface portions being of a lower refractive index than the refractive index of the opposed layers on another of said pairs.

5. An elongated light-transmitting fiber comprising a core formed of a transparent glass of a predetermined refractive index and of predetermined cross-sectional shape having a plurality of pairs of elongated side wall surface portions formed thereon, and with the surface portions of each pair being disposed in opposed facing relation to each other, a thin layer of cladding glass formed upon each surface portion, and all of said elongated layers being arranged to surround and enclose said core, the layers of cladding glass upon each pair of opposed surface portions having a lower refractive index than that of said core, the opposed layers of one of said pairs of surface portions being of a lower refractive index than the refractive index of the opposed layers on another of said pairs, and a layer of glass of predetermined light-absorption characteristics surrounding said pairs of layers of cladding glass and said core and in fused relation to said cladding layers.

6. An elongated light-transmitting fiber for use in forming an optical image transfer face plate, or the like, made up of a large number of such fibers arranged in side-by-side closely bunched and fixedly secured relation to each other, said fiber comprising an elongated fiber core formed of a transparent material having a predetermined refractive index, said core having substantially the same predetermined geometrical shape at all cross sections thereof throughout its length, and having a plurality of pairs of side wall surface portions with the surfaces of each pair disposed in opposed facing relation to each other, said fiber core having relatively thin claddings of material of substantially uniform thickness secured to said side wall surface portions throughout the length of said fiber so as to completely surround said core, the cladding material forming each pair of opposed side wall surface portions having a lower refractive index than that of said core, and the refractive index of one of said pairs of opposed claddings being of a lower refractive index than the refractive index of another of said pairs of opposed claddings, and means providing a predetermined amount of light absorption for each unit length of cladding material surrounding said core, whereby a maximum aperture angle of a predetermined restricted size will be provided said fiber when considered in one transverse direction thereof and a maximum aperture angle of a greater predetermined size will be provided said fiber when considered in another transverse direction thereof, and light rays impinging upon the ends of said fiber at angles greater than said maximum angles when in use will be nearly completely absorbed by said means.

7. An elongated light-transmitting fiber for use in forming an optical image transfer face plate, or the like, made up of a large number of such fibers arranged in side-by-side closely bunched and fixedly secured relation to each other, said fiber comprising an elongated fiber core formed of a transparent material having a predetermined refractive index, said core having substantially the same predetermined geometrical shape at all cross sections throughout its length and having two pairs of side wall surface portions substantially disposed in right angular relation to each other and with the surfaces of each pair disposed in opposed facing relation to each other, said fiber core having relatively thin claddings of material of substantially uniform thickness secured to said side wall surface portions throughout the length of said fiber so as to completely surround said core, the cladding material forming each pair of opposed side wall surface portions having a lower refractive index than that of said core, and the refractive index of one pair of opposed claddings being of a lower refractive index than the refractive index of the other pair, and means providing a predetermined amount of light absorption for each unit length of cladding material surrounding said core, whereby a maximum aperture angle of a predetermined restricted size will be provided said fiber when considered in one transverse direction thereof and a different maximum aperture angle of a greater predetermined size will be provided said fiber when considered in another transverse direction thereof, and light rays impinging upon the ends of said fiber at angles greater than said maximum angles when in use will be nearly completely absorbed by said means.

8. An elongated light-transmitting fiber formed of glass for use in forming a vacuum-tight optical image transfer plate, or the like, made up of a large number of such fibers arranged in side-by-side closely bunched fused relation to each other, said fiber comprising an elongated fiber core formed of a transparent glass having a predetermined refractive index, said core having substantially the same predetermined geometrical shape at all cross sections thereof throughout its length, and having a plurality of pairs of side wall surface portions with the surfaces of each pair disposed in opposed facing relation to each other, said fiber core having relatively thin claddings of glass of substantially uniform thickness fused to said side wall surface portions throughout the length of said fiber so as to completely surround said core, the cladding glass forming each pair of opposed side wall surface portions having a lower refractive index than that of said core, and the refractive index of one of said pair of opposed claddings being of a lower refractive index than the refractive index of another of said pairs of opposed claddings, and means providing a predetermined amount of light absorption for each unit length of cladding material surrounding said core, whereby a maximum aperture angle of a predetermined restricted size will be provided said fiber when considered in one transverse direction thereof and a maximum aperture angle of a greater predetermined size will be provided said fiber when considered in another transverse direction thereof, and light rays impinging upon the ends of said fiber at angles greater than said maximum angles when in use will be nearly completely absorbed by said means.

9. An elongated light-transmitting fiber for use in forming an optical image transfer face plate, or the like, made up of a large number of such fibers arranged in side-by-side closely bunched and fixedly secured relation to each other, said fiber comprising an elongated fiber core formed of a transparent material having a predetermined refractive index, said core having substantially the same predetermined hexagonal shape at all cross sections thereof throughout its length, and having a plurality of pairs of side wall surface portions with the surfaces of each pair disposed in opposed facing relation to each other, said fiber core having relatively thin claddings of material of substantially uniform thickness secured to said side wall surface portions throughout the length of said fiber so as to completely surround said core, the cladding material forming each pair of opposed side wall surface portions having a lower refractive index than that of said core, and the refractive index of one of said pairs of opposed claddings being of a lower refractive index than the refractive index of the other two pairs of opposed claddings, and means providing a predetermined amount of light absorption for each unit length of cladding material surrounding said core, whereby a maximum aperture angle of a predetermined restricted size will be provided said fiber when considered in two different transverse directions thereof and a maximum aperture angle of a greater predetermined size will be provided said fiber when considered in a third transverse direction thereof and light rays impinging upon the ends of said fiber at angles greater than said maximum angles when in use will be nearly completely absorbed by said means.

10. A fiber optical image-transmitting face plate, or the like, comprising a very large number of very thin elongated light-conducting fibers secured together in fixed side-by-side relation to each other, said fibers being of like predetermined geometric shape in cross section, and each of said fibers comprising a core formed of a light-conducting material of a predetermined refractive index surrounded by cladding material of a substantially uniform thickness, each of said cores being of such a predetermined cross-sectional shape as to provide a plurality of pairs of side wall surface portions thereon, and with the individual side wall surface portions of each pair disposed in opposed facing relation to each other, the cladding material upon a first pair of said opposed side wall surface portions being of a lesser predetermined refractive index than that of said core, and the predetermined refractive index of the cladding material upon a second pair of said opposed side wall surface portions being less than that of said first pair, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in one transverse direction thereof and a maximum aperture angle of a different predetermined restricted size will be provided each fiber when considered in a different transverse direction thereof, and means for producing a predetermined amount of light absorption for the cladding material surrounding each core so as to attenuate most of the light which enters the ends of said cores at angles greater than the said different maximum aperture angles during use of said face plate, whereby said face plate will have an optimum image-viewing area of a predetermined restricted angular value considered in one transverse direction thereof and of a different predetermined restricting angular value considered in a different direction thereof and will be substantially free from image contrast deterioration due to ambient light rays incident upon said face plate at angles greater than said maximum aperture angles.

11. A fiber optical image-transmitting face plate, or the like, comprising a very large number of very thin elongated light-conducting fibers secured together in fixed side-by-side relation to each other, said fibers being of like predetermined geometric shape in cross section, and each of said fibers comprising a core formed of a light-conducting material of a predetermined refractive index surrounded by cladding material of a substantially uniform thickness, each of said cores being of such a predetermined cross-sectional shape as to provide a plurality of pairs of side wall surface portions thereon, and with the individual side wall surface portions of each pair disposed in opposed facing relation to each other and with a first pair of said side walls disposed at right angles to a second pair thereof, the cladding material upon said first pair of said opposed side wall surface portions being of a lesser predetermined refractive index than that of said core, and the predetermined refractive index of the cladding material upon said second pair of said opposed side wall surface portions being less than that of said first pair, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in a first transverse direction thereof and a maximum aperture angle of a different predetermined restricted size will be provided each fiber when considered in a second transverse direction at right angles thereto, means for providing a predetermined amount of light absorption for the cladding material surrounding each core so as to attenuate most of the light which enters the ends of said cores at angles greater than the said different maximum aperture angles during use of said face plate, whereby said face plate will have an optimum image-viewing area of a predetermined restricted angular value considered in one transverse direction thereof and of a different predetermined restricting angular value considered in a second direction at right angles thereto and will be substantially free from image contrast deterioration due to ambient light rays incident upon said face plate at angles greater than said maximum aperture angles.

12. A fiber optical image-transmitting face plate, or the like, comprising a very large number of very thin elongated light-conducting fibers secured together in fixed side-by-side relation to each other, said fibers being of like predetermined geometric shape in cross section, and each of said fibers comprising a core formed of a light-conducting glass of a predetermined refractive index surrounded by cladding glass of a substantially uniform thickness, each of said cores being of such a predetermined cross-sectional shape as to provide a plurality of pairs of side wall surface portions thereon, and with the individual side wall surface portions of each pair disposed in opposed facing relation to each other, the cladding glass upon a first pair of said opposed side wall surface portions being of a lesser predetermined refractive index than that of said core, and the predetermined refractive index of the cladding glass upon a second pair of said opposed side wall surface portions being less than that of said first pair, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in one transverse direction thereof and a maximum aperture angle of a different predetermined restricted size will be provided each fiber when considered in a different transverse direction thereof, and means for providing a predetermined amount of light absorption for the cladding glass surrounding each core so as to attenuate most of the light which enters the ends of said cores at angles greater than the said different maximum aperture angles during use of said face plate, whereby said face plate will have an optimum image-viewing area of a predetermined restricted angular value considered in one transverse direction thereof and of a different predetermined restricting angular value considered in a different direction thereof and will be substantially free from image contrast deterioration due to ambient light rays incident upon said face plate at angles greater than said maximum aperture angles.

13. A fiber optical image-transmitting face plate, or the like, comprising a very large number of very thin elongated light-conducting fibers secured together in fixed side-by-side relation to each other, said fibers being of like predetermined geometric shape in cross section, and each of said fibers comprising a core formed of a light-conducting glass of a predetermined refractive index surrounded by cladding glass of a substantially uniform thickness, each of said cores being of such a predetermined cross-sectional shape as to provide a plurality of pairs of side wall surface portions thereon, and with the individual side wall surface portions of each pair disposed in opposed facing relation to each other, the cladding glass upon a first pair of said opposed side wall surface portions being of a lesser predetermined refractive index than that of said core, and the predetermined refractive index of the cladding glass upon a second pair of said opposed side wall surface portions being less than that of said first pair, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in one transverse direction thereof and a maximum aperture angle of a different predetermined restricted size will be provided each fiber when considered in a different transverse direction thereof, and a layer of glass having a predetermined amount of light absorption surrounding each core and its cladding so as to attenuate most of the light which enters the ends of each core at angles greater than the said different maximum aperture angles during use of said face plate, whereby said face plate will have an optimum image-viewing area of a predetermined restricted angular value considered in one transverse direction thereof and of a different predetermined restricting angular value considered in a different direction thereof and will be substantially free from image contrast deterioration due to ambient light rays incident upon said face plate at angles greater than said maximum aperture angles.

14. A fiber optical image-transmitting face plate, or the like, comprising a very large number of very thin elongated light-conducting fibers secured together in fixed side-by-side relation to each other, said fibers being of hexagonal shape in cross section, and each of said fibers comprising a core formed of a light-conducting material of a predetermined refractive index surrounded by cladding material of a substantially uniform thickness, each of said cores being of such a predetermined cross-sectional shape as to provide a plurality of pairs of side wall surface portions thereon, and with the individual side wall surface portions of each pair disposed in opposed relation to each other, the cladding material upon a first and second pair of said opposed side wall surface portions being of a lesser predetermined refractive index than that of said core, and the predetermined refractive index of the cladding material upon a third pair of said opposed side wall surface portions being less than that of said first and second pairs, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in first and second transverse directions thereof and a maximum aperture angle of a somewhat greater predetermined restricted size will be provided each fiber when considered in a third transverse direction thereof, and means for providing a predetermined amount of light absorption or the cladding material surrounding each core so as to attenuate most of the light which enters the ends of said cores at angles greater than the said different maximum aperture angles during use of said face plate whereby said face plate will have an optimum image-viewing area of a predetermined restricted angular value considered in two different transverse directions thereof and of a different larger predetermined restricting angular value considered in a third direction thereof and will be substantially free from image contrast deterioration due to ambient light rays incident upon said face plate at angles greater than said maximum aperture angles.

15. A fiber optical image-transmitting face plate, or the like, comprising a very large number of very thin elongated light-conducting fibers secured together in fixed side-by-side relation to each other, said fibers being of like predetermined geometric shape in cross section, and each of said fibers comprising a core formed of a light-conducting material of a predetermined refractive index surrounded by cladding material of a substantially uniform thickness, each of said cores being of such a predetermined cross-sectional shape as to provide a plurality of pairs of side wall surface portions thereon, and with the individual side wall surface portions of each pair disposed in opposed facing relation to each other, the cladding material upon a first pair of said opposed side wall surface portions being of a lesser predetermined refractive index than that of said core, and the predetermined refractive index of the cladding material upon a second pair of said opposed side wall surface portions being less than that of said first pair, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in one transverse direction thereof and a maximum aperture angle of a different predetermined restricted size will be provided each fiber when considered in a different transverse direction thereof, the cladding material upon each pair of wall surfaces having such light absorption characteristics as to attenuate most of the light which enters the ends of said cores at angles greater than the said different maximum aperture angles during use of said face plate, whereby said face plate will have an optimum image-viewing area of a predetermined restricted angular value considered in one transverse direction thereof and of a different predetermined restricting angular value considered in a different direction thereof and will be substantially free from image contrast deterioration due to ambient light rays incident upon said face plate at angles greater than said maximum aperture angles.

16. A fiber optical image-transmitting face plate, or the like, comprising a very large number of very thin elongated light-conducting fibers secured together in fixed side-by-side relation to each other, said fibers being of like predetermined geometric shape in cross section, and each of said fibers comprising a core formed of a light-conducting material of a predetermined refractive index surrounded by cladding material of a substantially uniform thickness, each of said cores being of such a predetermined cross-sectional shape as to provide a plurality of pairs of side wall surface portions thereon, and with the individual side wall surface portions of each pair disposed in opposed facing relation to each other, the cladding material upon a first pair of said opposed side wall surface portions being of a lesser predetermined refractive index than that of said core, and the predetermined refractive index of the cladding material upon a second pair of said opposed side wall surface portions being less than that of said first pair, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in one transverse direction thereof and a maximum aperture angle of a different predetermined restricted size will be provided each fiber when considered in a different transverse direction thereof, and a layer of light absorbing cladding material in overlying and surrounding relation to said layers of cladding material upon the side wall surface portions of each core and having such absorption characteristics as to attenuate most of the light which enters the ends of said cores at angles greater than the said different maximum aperture angles during use of said face plate, whereby said face plate will have an optimum image-viewing area of a predetermined restricted angular value considered in one transverse direction thereof and of a different predetermined restricting angular value considered in a different direction thereof and will be substantially free from image contrast deterioration due to ambient light rays incident upon said face plate at angles greater than said maximum aperture angles.

17. A fiber optical image-transmitting face plate, or the like, comprising a very large number of very thin elongated light-conducting fibers secured together in fixed side-by-side relation to each other, said fibers being of hexagonal shape in cross section, and each of said fibers comprising a core formed of a light-conducting material of a predetermined refractive index surrounded by cladding material of a substantially uniform thickness, each of said cores being of such a predetermined cross-sectional shape as to provide a plurality of pairs of side wall surface portions thereon, and with the individual side wall surface portions of each pair disposed in opposed facing relation to each other, the cladding material upon a first and second pair of said opposed side wall surface portions being of a lesser predetermined refractive index than that of said core, and the predetermined refractive index of the cladding material upon a third pair of said opposed side wall surface portions being less than that of said first and second pairs, said fibers in said face plate being similarly oriented so as to have like pairs of side wall surface portions of the different fibers, respectively, facing in substantially the same transverse directions, whereby a maximum aperture angle of a predetermined restricted size will be provided each fiber when considered in first and second transverse directions thereof and a maximum aperture angle of a somewhat greater predetermined restricted size will be provided each fiber when considered in a third transverse direction thereof, and a layer of light absorbing cladding material in overlying and surrounding relation to said layers of cladding material upon the side wall surface portions of each core and having such absorption characteristics as to attenuate most of the light which enters the ends of said cores at angles greater than the said different maximum aperture angles during use of said face plate, whereby said face plate will have an optimum image-viewing area of a predetermined restricted angular value considered in two different transverse directions thereof and of a different larger predetermined restricting angular value considered in a third direction thereof and will be substantially free from image contrast deterioration due to ambient light rays incident upon said face plate at angles greater than said maximum aperture angles.

No references cited.

JEWELL H. PEDERSEN, *Primary Examiner.*

JOHN K. CORBIN, *Examiner.*